United States Patent
Bouchez

(10) Patent No.: US 11,336,186 B2
(45) Date of Patent: May 17, 2022

(54) RESONANT DC-DC VOLTAGE CONVERTER

(71) Applicant: Valeo Siemens eAutomotive Norway AS, Drammen (NO)

(72) Inventor: Boris Bouchez, Solbergelva (NO)

(73) Assignee: Valeo Siemens eAutomotive Norway AS, Drammen (NO)

( * ) Notice: Subject to any disclaimer, the term of this patent is extended or adjusted under 35 U.S.C. 154(b) by 0 days.

(21) Appl. No.: 16/526,138

(22) Filed: Jul. 30, 2019

(65) Prior Publication Data

US 2020/0044571 A1 Feb. 6, 2020

(30) Foreign Application Priority Data

Jul. 31, 2018 (FR) ...................................... 1857150

(51) Int. Cl.
*H02M 3/335* (2006.01)
*H02M 1/08* (2006.01)
*B60L 50/50* (2019.01)

(52) U.S. Cl.
CPC ....... *H02M 3/33569* (2013.01); *H02M 1/083* (2013.01); *B60L 50/50* (2019.02); *B60L 2210/10* (2013.01)

(58) Field of Classification Search
CPC .......................... H02M 3/33569; H02M 1/083
See application file for complete search history.

(56) References Cited

U.S. PATENT DOCUMENTS

| | | | | |
|---|---|---|---|---|
| 2012/0063173 | A1* | 3/2012 | Fu ........................... | H02M 3/28 363/21.02 |
| 2012/0163035 | A1* | 6/2012 | Song ................. | H02M 3/33584 363/17 |
| 2012/0262953 | A1* | 10/2012 | Jungreis ............ | H02M 3/33569 363/17 |
| 2014/0368175 | A1 | 12/2014 | Ryoo et al. | |
| 2019/0044447 | A1* | 2/2019 | Wang .................... | H02M 3/285 |

FOREIGN PATENT DOCUMENTS

KR 101377124 B1 4/2014

OTHER PUBLICATIONS

Search Report from French Intellectual Property Office on co-pending FR application (FR1857150) dated Mar. 20, 2019.

* cited by examiner

*Primary Examiner* — Toan T Vu
*Assistant Examiner* — Thai H Tran
(74) *Attorney, Agent, or Firm* — Klein, O'Neill & Singh, LLP

(57) ABSTRACT

The subject matter of the invention is a resonant DC-DC voltage converter, notably for an electric or hybrid vehicle, said converter including n interleaved main resonant circuits, n being a natural integer greater than or equal to two, and in which:
the main resonant circuits are connected together at least one neutral point different from a ground of the converter,
said neutral point being connected to a ground of the converter by an impedance configured to store energy and to enable zero voltage switching of the switches of the resonant DC-DC converter.

10 Claims, 4 Drawing Sheets

RESONANT DC-DC VOLTAGE CONVERTER

TECHNICAL FIELD

Generally speaking, the invention relates to a resonant DC-DC voltage converter, notably in the field of electrical systems, more specifically configured for the recharging of a power supply battery, notably configured to be on board an automobile vehicle, such as an automobile vehicle with an electric or hybrid engine.

More specifically, in the context of an electric or hybrid vehicle including a low voltage power supply battery for the supply of items of electrical equipment of the vehicle and a high voltage power supply battery to contribute to the propulsion of the vehicle, it is known that an on board charger, commonly designated by those skilled in the art by the acronym OBC, including a resonant DC-DC voltage converter, is used for recharging the high voltage power supply battery.

The invention thereby relates to a resonant DC-DC voltage converter as well as an electric charger including such a converter. The electric charger is in particular on board an electric or hybrid vehicle to enable notably the electrical charging of a high voltage power supply battery of the vehicle and/or the supply of electrical energy by said high voltage power supply battery to the outside of the vehicle, for example to an electrical network, an equipment or a building.

BACKGROUND

As is known, an electric or hybrid automobile vehicle comprises an electric motorisation system, supplied by a high voltage power supply battery via an on board high voltage electrical network, and a plurality of auxiliary items of electrical equipment supplied by a low voltage power supply battery via an on board low voltage electrical network. Thus, the high voltage power supply battery ensures a function of supplying the electric motorisation system with energy enabling the propulsion of the vehicle. The low voltage power supply battery supplies the auxiliary items of electrical equipment, such as on board computers, window winder motors, a multimedia system, etc. The high voltage power supply battery typically delivers a voltage comprised between 100 V and 900 V, preferably between 100 V and 500 V, whereas the low voltage power supply battery typically delivers a voltage of the order of 12 V, 24 V or 48 V. These two high and low voltage power supply batteries must be able to be charged.

The recharging of the high voltage power supply battery with electrical energy is carried out in a known manner by connecting it, via a direct current high voltage electrical network of the vehicle, to an external electricity supply network, for example the domestic AC electricity supply network. To this end, the high voltage power supply battery is capable of being connected to the domestic AC electricity supply network, for its charging, via an on board electric charger, designated OBC.

In a known solution, such an on board charger mainly comprises a PFC (power factor correction) circuit and a resonant DC-DC voltage converter notably making it possible to form the galvanic insulation between the AC network and the DC network. In an electric or hybrid vehicle application, it may be necessary to use several DC-DC voltage converters in order to be able to produce the necessary power, for example by connecting them in parallel. However, such an arrangement may require the use of filters which cause overheating of the components. A known method for overcoming this drawback consists in interleaving the DC-DC voltage converters, as is represented in FIG. 1 as an example for three converters forming a set 1 of converters. Such an interleaving makes it possible to manage the converters at a same frequency.

Several topologies of resonant DC-DC voltage converter exist. Among these topologies may be distinguished notably LLC type converters. Such converters include in a known manner a transformer, including a primary part and a secondary part; a capacitor; two coils; and switches which are switched in such a way as to enable the conversion of a first DC voltage delivered to the primary part into a second DC voltage supplied by the secondary part. In order to reduce losses by switching of the switches, it is known to add a capacitor in parallel with each switch, such a configuration enabling what is known by those skilled in the art as ZVS (zero voltage switching) operation. In an LC type circuit, in which Lr notes the inductive element, for example a coil, and Cr notes the resonance capacitor, ZVS operation cannot be implemented in a permanent manner in high voltage applications. Indeed, such ZVS operation requires storing energy in the coil Lr. Yet, at voltage values of 400 V or above, at which such resonant DC-DC voltage converters operate in the electric or hybrid vehicles of today, the energy passing through the switches is such that it can no longer be entirely stored in the coil Lr, which leads to losses by switching at the level of the switches. An LLC type circuit makes it possible to overcome in part these drawbacks, because the addition of a second inductive element, noted Lm, makes it possible to store supplementary energy compared to an LC type circuit. However, when the second inductive element is integrated in the primary part of the transformer, the storage of energy requires a particular configuration of the transformer, the latter not being originally adapted to store energy. Also, in order to enable the primary part of the transformer to store energy, it is known to form an air gap in the core of the transformer, notably in the primary part. In so doing, this makes the transformer more complex and more costly to manufacture, increases electromagnetic perturbations, and may produce what are known by those skilled in the art as "fringing effects" which can lead to thermal losses.

There thus exists the need for a simple, reliable and efficient solution of electrical charger making it possible to overcome at least in part these drawbacks.

SUMMARY

To this end, the invention firstly relates to a resonant DC-DC voltage converter, notably for an electric or hybrid vehicle, said converter including n interleaved main resonant circuits, n being a natural integer greater than or equal to two, and in which:
  the main resonant circuits are connected at a same neutral point different from a ground of the converter,
  said neutral point being connected to the ground of the converter by an impedance configured to store energy and to enable zero voltage switching of the switches of the resonant DC-DC converter.

Thanks to said impedance, the resonant DC-DC voltage converter can store energy in order to implement zero voltage switching (ZVS) whatever the operating point of the converter, that is to say whatever its input voltage-output voltage pairing. The resonant DC-DC voltage converter can thus operate in ZVS independently of the charge applied at the output of the converter. This characteristic is particularly suited to the case where the main resonant circuits are of LC type, because it makes it possible to operate in ZVS whatever the operating point of the converter. The impedance notably enables a storage of energy for currents for which the harmonics are multiples of rank n, where n is the number of main resonant circuits. Neutral point is notably taken to mean an electrical node to which all the main resonant circuits are connected. In particular, said electrical node receives an electric current from each main resonant circuit, this current determining an output of the main resonant circuit.

According to an alternative, said impedance comprises an inductance, notably an inductance in series with a capacitor.

According to an alternative, said impedance forms a subsidiary resonant circuit different from said main resonant circuits. Notably, the subsidiary resonant circuit forms a circuit of LC, or LLC, type or of another type of resonant circuit. In particular, said subsidiary resonant circuit comprises an inductance in series with a capacitor, or an inductance in parallel with a capacitor. The resonance frequency of the subsidiary resonant circuit makes it possible to improve zero voltage switching at specific operating ranges of the DC-DC voltage converter.

According to an alternative, each main resonant circuit comprises a transformer including at least one primary winding and at least one secondary winding, and said neutral point is connected to a terminal of a winding of the transformer of each main resonant circuit. In particular, the transformers of said main resonant circuits are configured to transmit energy between an input and an output of the resonant DC-DC converter. Notably, the plurality of primary windings is galvanically insulated from the plurality of secondary windings in order not to form the electrical connection between the two.

According to an alternative, a first neutral point is connected to the primary windings of the transformers of each main resonant circuit. In other words, the primary windings of said transformers, are connected together at the level of a same neutral point called "first neutral point" different from a ground of the converter. Notably, the first neutral point is different from a primary side ground or from a secondary side ground. The first neutral point is connected to the ground of the converter, notably to the primary side ground, by an impedance configured to store energy and to enable zero voltage switching of the switches of the resonant DC-DC converter. Thanks to the impedance connected to the first neutral point, the converter can implement zero voltage switching for the switches of the converter which are situated on the primary side of the converter. In particular, branches each including one of said primary windings of the transformers are connected at the level of the first neutral point.

According to an alternative, the main resonant circuits of the converter are each connected to a respective input structure including at least one switch configured to control an energy circulating in the main resonant circuit, and the impedance connected to the first neutral point is configured to store energy and to enable zero voltage switching of the switches of said input structures. In particular, the input structures are connected to the primary side of the transformer of the main resonant circuits. Notably, the input structure comprises a half-bridge structure including an upper switch and a lower switch connected at the level of a mid-point, said mid-point being connected to the respective main resonant circuit.

According to an alternative, a second neutral point is connected to the secondary windings of the transformers of each main resonant circuit. In other words, the secondary windings of said transformers are connected together at the level of a same neutral point called "second neutral point" different from a ground of the converter. Notably, the second neutral point is different from a primary side ground or from a secondary side ground. The second neutral point is connected to the ground of the converter, notably to the secondary side ground, by an impedance configured to store energy and to enable zero voltage switching of the switches of the resonant DC-DC converter. Thanks to the impedance connected to the second neutral point, the converter may implement zero voltage switching for the switches of the converter which are situated on the secondary side of the converter. In particular, branches each including one of said secondary windings of the transformers are connected at the level of the second neutral point.

According to an alternative, the main resonant circuits of the converter are each connected to a respective output structure including at least one switch configured to control an energy circulating in the main resonant circuit, and the impedance connected to the second neutral point is configured to store energy and to enable zero voltage switching of the switches of said output structures. In particular, the output structures are connected to the secondary side of the transformer, notably to the secondary windings, of the main resonant circuits. Notably, the output structure comprises a half-bridge structure including an upper switch and a lower switch connected at the level of a mid-point, said mid-point being connected to the respective main resonant circuit.

Notably the first neutral point is different from the second neutral point. In particular, the first neutral point is only connected to the primary windings and/or the second neutral point is only connected to the secondary windings.

According to an alternative, each main resonant circuit comprises at least one first inductive element and a resonance capacitor connected to said first inductive element, configured to resonate with each other. Notably, said first inductive element, the resonance capacitor and the primary winding of the transformer are comprised in a branch of the main resonant circuit, designated "resonance branch". In particular, the first neutral point is connected to the resonance branches of the main resonant circuits.

According to an alternative, each main resonant circuit is at least of LC type.

Notably, the transformer of each main resonant circuit comprises a second inductive element. The second inductive element is notably connected in parallel with the primary winding in order to form a main resonant circuit of LLC type.

According to an aspect of the invention, the first inductive elements and/or the second inductive elements are induction coils.

The invention also relates to an electric charger, notably for an electric or hybrid vehicle, including a converter such as described previously.

The invention also relates to an electric or hybrid vehicle including a DC-DC voltage converter such as described previously.

BRIEF DESCRIPTION OF THE DRAWINGS

The invention will be better understood on reading the description that follows, given only as an example, and by referring to the appended drawings given as non-limiting examples, in which identical references are given to similar objects and in which.

Figure 1:
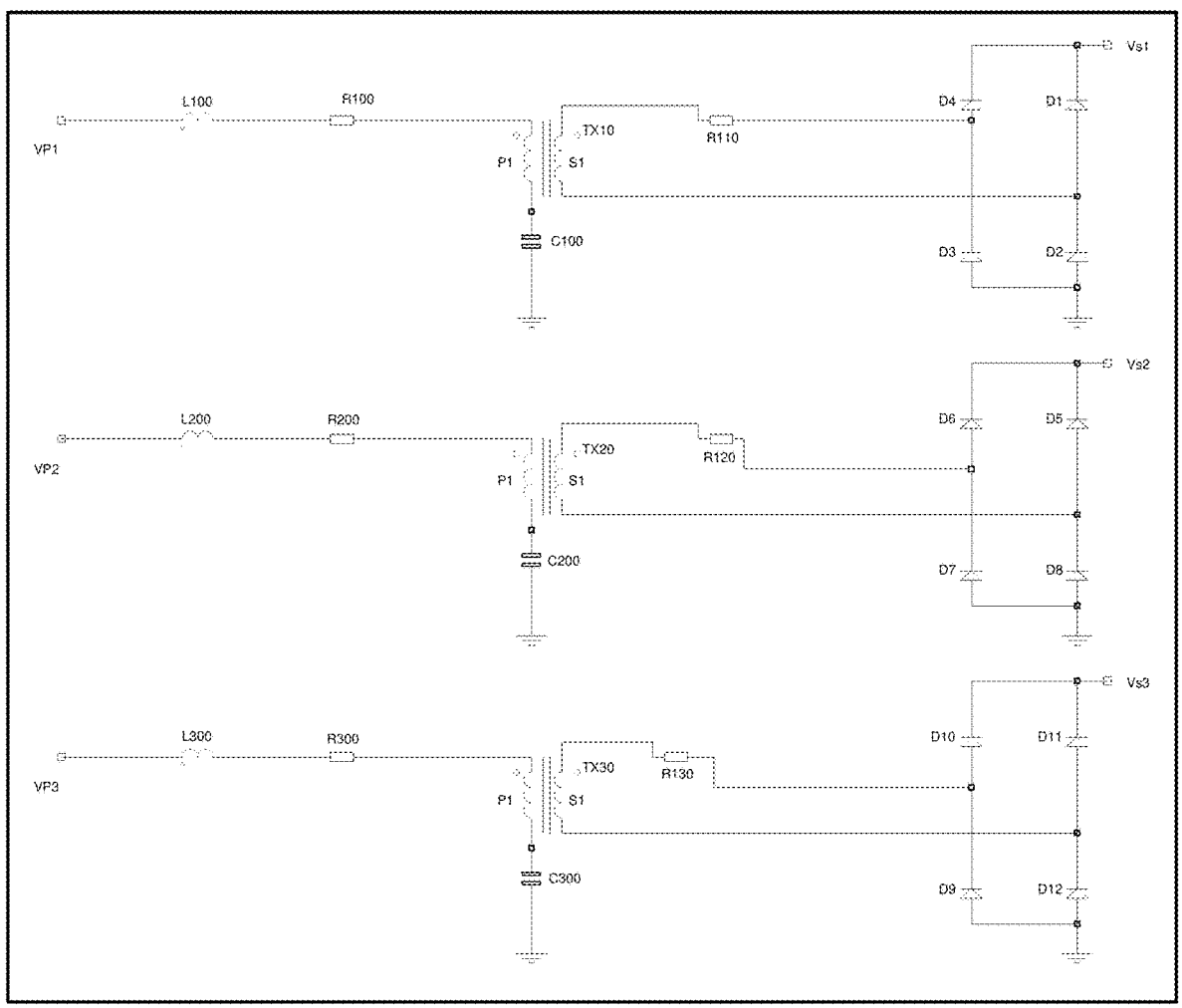
FIG. 1 represents an example of interleaved resonant DC-DC converter of the prior art.

It should be noted that the figures explain the invention in a detailed manner for implementing the invention, said figures obviously being able to serve to better define the invention if needs be.

DETAILED DESCRIPTION

In the description that will be made hereafter, the invention will be described in its application to an electric or hybrid automobile vehicle without this limiting the scope of the present invention.

For example, such a vehicle may notably comprise an electrical machine, an inverter, a set of converters, a high voltage power supply battery, an on board high voltage electrical network, a low voltage power supply battery, an on board low voltage electrical network and a plurality of auxiliary items of electrical equipment.

The converter according to the invention is described hereafter in its implementation for a DC-DC converter on board the vehicle in order to convert a voltage between the low and high voltage electrical networks, without however this limiting the scope of the present invention. It will thus be noted that the converter could be comprised in an electric charger, notably on board a vehicle.

The on board low voltage electrical network connects the low voltage power supply battery and the plurality of auxiliary items of electrical equipment in order that the low voltage power supply battery supplies said auxiliary items of electrical equipment, such as on board computers, window winder motors, a multimedia system, etc. The low voltage power supply battery typically delivers for example a voltage of the order of 12 V, 24 V or 48 V. The recharging of the low voltage battery is carried out from the high voltage battery via a direct current into direct current voltage converter, commonly called DC-DC converter.

The on board high voltage electrical network connects the high voltage power supply battery and the inverter in order that the high voltage power supply battery ensures a function of supplying the electrical machine with energy via the inverter. The high voltage power supply battery typically delivers a voltage comprised between 100 V and 900 V, preferably between 100 V and 500 V. The recharging of the high voltage power supply battery with electrical energy is carried out by connecting it, via the direct current high voltage electrical network of the vehicle, to an external electrical network, for example the domestic AC electrical network.

The electrical machine is a rotating electrical machine, preferably configured to drive the wheels of the vehicle from the energy supplied by the high voltage power supply battery. More specifically, the electrical machine is an alternating current electrical machine supplied by a polyphase current source. For example, the electrical machine may be an alternating current motor. In the preferred example described hereafter, the electrical machine is supplied by a three-phase current source without this limiting the scope of the present invention.

In this example, the control of the electrical machine is achieved by means of the inverter. Said inverter makes it possible to convert the direct current supplied by the high voltage power supply battery into three alternating control currents, for example sinusoidal. In other words, the function of the inverter is to transform the direct current delivered by the high voltage power supply battery into three phase currents making it possible to control the electrical machine. Conversely, in another operating mode, the electrical machine can also supply three alternating currents to the inverter in order that said inverter transforms them into a direct current making it possible to charge the high voltage power supply battery.

Figure 2:
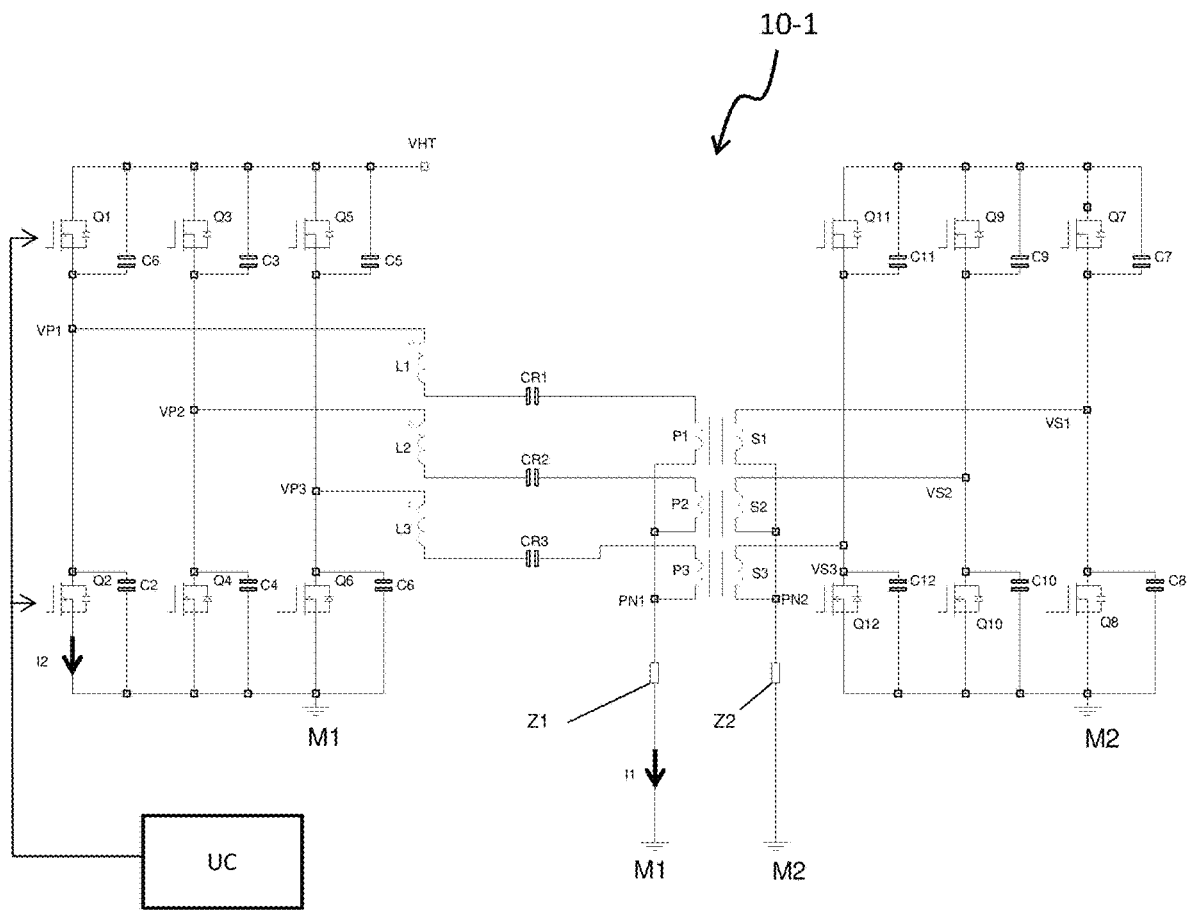
FIG. 2 represents an example of a converter according to the invention.

In FIG. 2 is represented an example of an electrical converter 10-1 according to the invention.

The converter 10-1 is a resonant converter configured to convert a direct current voltage into a direct current voltage and comprises three so-called "main" resonant circuits. However, it could comprise a different number of main resonant circuits.

Notably, each main resonant circuit comprises a transformer, each including at least one primary winding P1, P2, P3 and at least one secondary winding S1, S2, S3. Each main resonant circuit further comprises a resonance capacitor CR1, CR2, CR3 and a first inductive element L1, L2, L3. The primary winding P1, P2, P3, the resonance capacitor CR1, CR2, CR3 and the first inductive element L1, L2, L3 are for example comprised in a branch of the main resonant circuit designated "resonance branch" and are notably in series. For example, the first inductive element L1, L2, L3 may be connected to a terminal of the resonance capacitor CR1, CR2, CR3, the other terminal of the resonance capacitor CR1, CR2, CR3 being connected to a terminal of the primary winding P1, P2, P3 of the transformer, optionally via a resistor (not represented). Each first inductive element L1, L2, L3 forms with the resonance capacitor CR1, CR2, CR3 a main resonance circuit of LC type.

The first inductive elements L1, L2, L3, are preferably induction coils. A galvanic insulation is formed between the primary windings P1, P2, P3 and the secondary windings S1, S2, S3 of the transformers of the three main resonant circuits. A first ground M1 constitutes a reference potential of the primary side converter 10-1, and a second ground M2 constitutes a reference potential of the secondary side converter 10-1.

Each main resonant circuit may be connected to an input structure comprising switches Q1-Q6 configured to control an energy circulating in the main resonant circuits. In particular, in each input structure, the switches Q1-Q6 are arranged in a half-bridge including an upper switch Q1, Q3, Q5 and a lower switch Q2, Q4, Q6 connected at the level of a mid-point. The upper switch Q1, Q3, Q5 is notably connected to a high potential VHT of an electrical network of the vehicle, notably the high voltage network of the vehicle. The lower switch Q2, Q4, Q6 is notably connected to a low potential of an electrical network of the vehicle, notably the high voltage network of the vehicle. This low potential corresponds notably to the first ground M1. The mid-point is connected to the corresponding main resonant circuit, notably to the resonance branch including the primary winding P1, P2, P3 of the transformer of said main resonant circuit. The switches Q1-Q6 are for example transistors, notably of MOS type. Capacitors C1-C6 are connected in parallel with the switches Q1-Q6 to enable ZVS of the switches Q1-Q6.

Each main resonant circuit may be connected to an output structure comprising switches Q7-Q12 configured to control an energy circulating in the main resonant circuits. In particular, in each output structure, the switches Q7-Q12 are arranged in a half-bridge including an upper switch Q7, Q9, Q11 and a lower switch Q8, Q10, Q12 connected at the level of a mid-point. The upper switch Q7, Q9, Q11 is notably connected to a high potential of an electrical network of the vehicle, notably the low voltage network of the vehicle. The lower switch Q8, Q10, Q12 is notably connected to a low potential of an electrical network of the vehicle, notably the low voltage network of the vehicle. This low potential corresponds notably to the second ground M2. The mid-point is connected to the corresponding main resonant circuit, notably to a branch including the secondary winding S1, S2, S3 of the transformer of said main resonant circuit. The switches Q7-Q12 are for example transistors, notably of MOS type. Capacitors C7-C12 are connected in parallel with the switches Q7-Q12 to enable ZVS of the switches Q7-Q12.

The converter 10-1 notably comprises a control unit UC which is configured to control the switches Q1-Q12 of the converter.

In an advantageous manner, in each main resonant circuit, a second inductive element (not represented) may be added in parallel with the secondary winding S1, S2, S3 of the transformer of said main resonant circuit or in parallel with the primary winding P1, P2, P3 of the transformer of said main resonant circuit. This second inductive element is preferably an induction coil. This second inductive element makes it possible to form, with the first inductive element L1, L2, L3 and the resonance capacitor CR1, CR2, CR3, a main resonant circuit of LLC type. It will be noted that, alternatively, the second inductive element may be the secondary winding S1, S2, S3 of the transformer of the main resonant circuit when said secondary winding S1, S2, S3 has a magnetising inductance, or the primary winding P1, P2, P3 of the transformer of the main resonant circuit when said primary winding P1, P2, P3 has a magnetising inductance. Such a magnetising inductance may be formed by an air gap in the core of the transformer.

The main resonant circuits are such that the primary windings P1, P2, P3 are connected to a first so-called "neutral" point PN1 and the secondary windings S1, S2, S3 are connected to a second so-called "neutral" point PN2.

The first neutral point PN1 is connected to the first ground M1 of the DC-DC converter via a first impedance Z1 configured to store energy and to enable zero voltage switching of the switches Q1-Q6 of the input structures of the resonant DC-DC converter 10-1. The first impedance Z1 makes it possible to operate the converter 10-1 in ZVS whatever the operating point of the converter 10-1, when the converter 10-1 transfers energy from the primary to the secondary.

Figure 3:
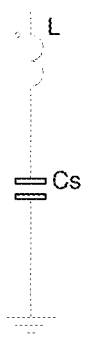
FIGS. 3 to 5 represent examples of an impedance connected to the neutral point of the converter of FIG. 2, FIGS. 6 and 7 illustrate currents circulating in the converter of FIG. 2.
Figure 6:
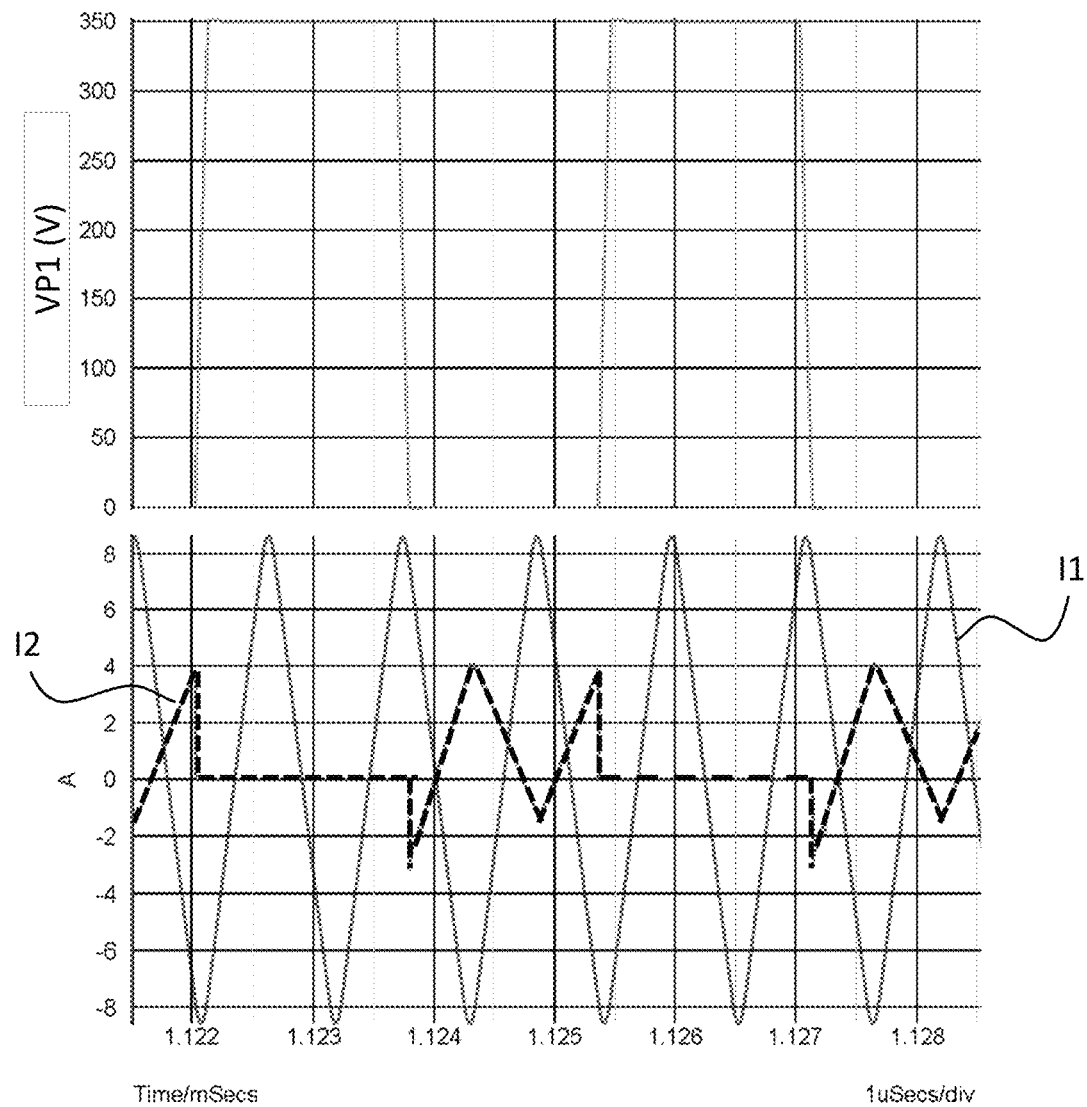
Figure 7:
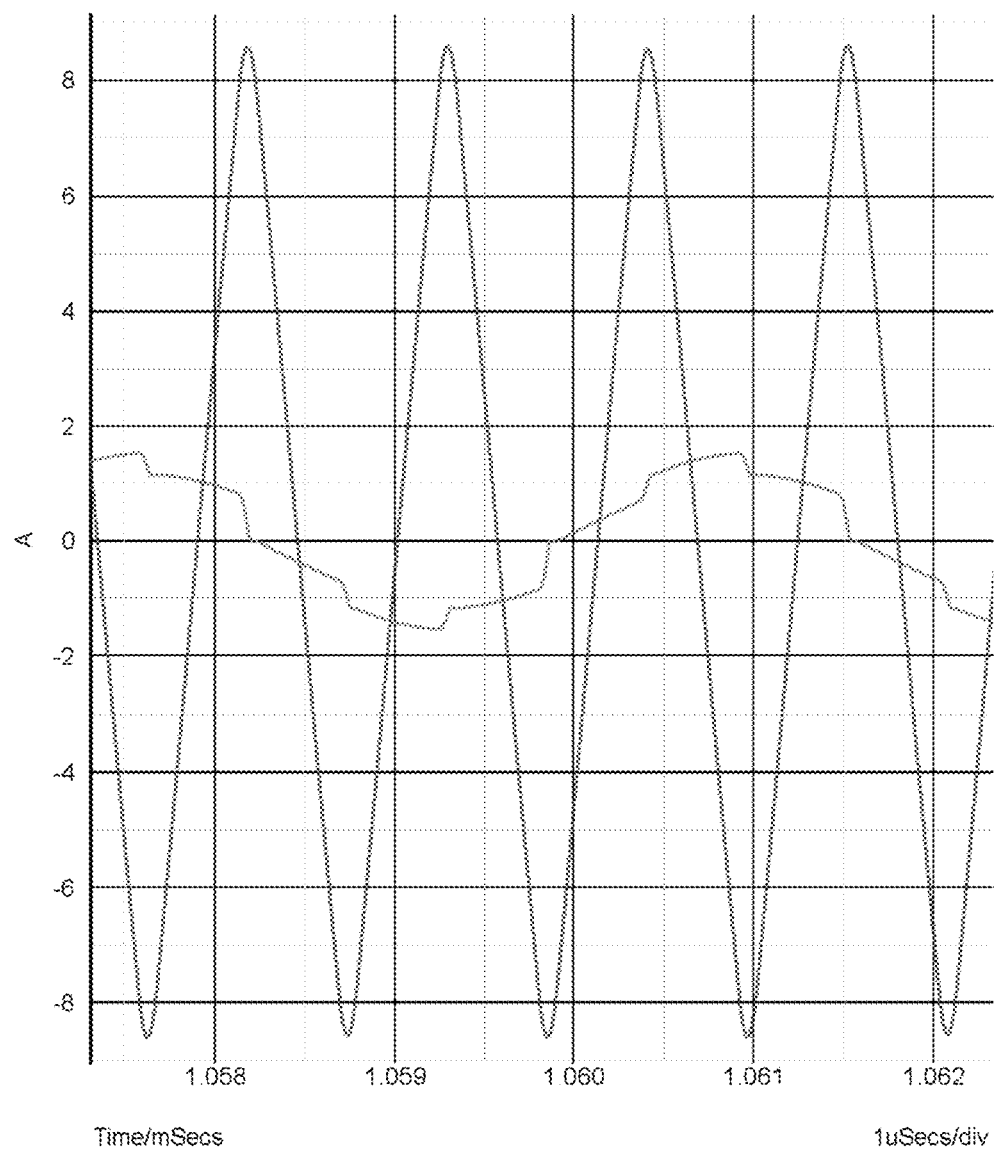

This will be better understood by referring to FIG. 6 which comprises a graph representing the voltage VP1 at a mid-point P1 of the input structure of the first main resonant circuit including the first inductive element L1 and the resonance capacitor CR1. FIG. 6 also comprises a graph representing the current I2 (in broken lines) circulating in the lower transistor Q2 of the input structure of the first main resonant circuit and the current I1 circulating in a first impedance Z1 such as illustrated in FIG. 3.

During operation of the converter 10-1, the switches Q1-Q6 of the input structures periodically switch in such a way as to transfer energy from the primary side to the secondary side. The first impedance Z1 receives a harmonic current of rank 3. The energy $E_{ZVS}$ necessary for the discharge of the capacitor C2 in parallel with the lower switch Q2 is given by the expression $E_{ZVS} = \frac{1}{2} \times C2 \times V^2$, where V is the input voltage VHT. The energy $E_{Z1}$ stored in the first impedance Z1 is given by the relationship $E_{Z1} = \frac{1}{2} \times L \times I1^2$, where L is the inductance of the first impedance Z1, the capacitor Cs being neglected. The same relationships are obtained with the voltages VP2, VP3 of the mid-points of the second and third main resonant circuits. The capacitor Cs of the impedance Z1 makes it possible to avoid a direct component in the voltage at the terminals of the inductance L of the impedance Z1, which otherwise would lead to a growth of the current i2 towards infinity. For a capacitor C2 in parallel with the lower transistor Q2, by taking a maximum value of the input voltage VHT, and a minimum value for the current I2, it is possible to choose a value of inductance L which makes it possible to store the energy necessary for zero voltage switching at the terminals of the lower switch Q2 of the input structure of the first main resonant circuit, and more generally for all the switches of the input structures. The first impedance Z1 enables a similar behaviour for the other switches Q1-Q6 of the input structures. Thus, the harmonic current i2 of rank 3 circulating in the first impedance Z1, in particular in the inductance L, makes it possible to discharge the capacitor C2-C6 in parallel with the switches Q1-Q6 of the input structures. Which makes it possible to open the switches Q1-Q6 at a zero voltage.

This is particularly advantageous when the main resonant circuits are of LC type. Indeed, an interleaved converter 1 of the prior art including resonant circuits LC, such as that illustrated in FIG. 1, does not make it possible to carry out ZVS over the whole operating range of the converter 1. Depending on the operating point, the resonance of the inductive element L100, L200, L300 with the resonance capacitor C100, C200, C300 may not be sufficient to store energy for this purpose. In the converter 10-1 according to an example of the invention, the first impedance Z1 is on the other hand always available for storing the energy necessary for ZVS.

In FIG. 2, in a similar manner the second neutral point PN2 is connected to the second ground M2 of the DC-DC converter via a second impedance Z2 configured to store energy and to enable zero voltage switching of the switches Q7-Q12 of the output structures of the resonant DC-DC converter. The second impedance Z1 makes it possible to operate the converter 10-1 in ZVS whatever the operating point of the converter 10-1, when the resonant DC-DC converter transfers energy from the secondary to the primary. This is particularly adapted when the resonant DC-DC voltage converter 10-1 is configured to exchange energy not only from the primary to the secondary, but also from the secondary to the primary, that is to say when the resonant DC-DC voltage converter is configured to operate in a bidirectional manner.

However, the converter 10-1 could be unidirectional, and for example only enable an exchange of energy from the primary to the secondary. The converter 10-1 is then without output structures such as described previously, but may comprise diodes replacing the switches. The converter 10-1 may then be without the second impedance Z2, or even the second neutral point PN2. The output structures may then be similar to those of the converter of FIG. 1.

Figure 4:
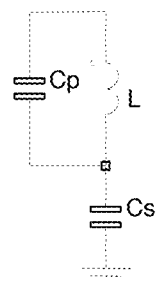
Figure 5:

The first and second impedances Z1, Z2 may be so-called "subsidiary" resonant circuits for example such as illustrated in FIGS. 3 and 4. In particular, the impedance Z1, Z2 may comprise an inductance L in series with a capacitor Cs, as in FIG. 3 for example. The impedance Z1, Z2 may comprise an inductance L in parallel with a capacitor $C_P$, which comes in series with a capacitor Cs, as in FIG. 4 for example. Advantageously, when the impedance Z1, Z2 is a subsidiary resonant circuit, it is possible to modify the behaviour of the impedance Z1, Z2 with the frequency at which the switches of the input or output structures switch. Which makes it possible for example to obtain more or less currents of greater or lesser intensities in the converter as a function of the operating points. However, the impedance Z1, Z2 may be of any type making it possible to store energy with a view to zero voltage switching, for example an inductance L as illustrated in FIG. 5.

The invention claimed is:

1. A resonant DC-DC voltage converter, notably for a hybrid or electric vehicle, said converter comprising:
   N interleaved main resonant circuits, where N being a natural integer greater than or equal to two, and in which:
   the main resonant circuits, each main resonant circuit comprising a transformer, each transformer including at least one primary winding and at least one secondary winding, are connected together at at least one neutral point different from a ground of the converter,
   said neutral point being connected to the ground of the converter only through an impedance configured to store energy and to enable zero voltage switching of a plurality of switches of the resonant DC-DC converter;
   wherein each main resonant circuit further comprises a first inductive element and a resonance capacitor, the first inductive element, the resonance capacitor, and the primary winding of the transformer being coupled in series; and
   wherein said impedance comprises an inductance and a capacitance; and
   wherein the impedance is different from components of the main resonant circuits, the components being configured to resonate between the electronic components of each main resonant circuit.

2. The converter according to claim 1, in which said impedance forms a subsidiary resonant circuit different from said main resonant circuits.

3. The converter according to claim 1, wherein said neutral point is connected to a terminal of a winding of the transformer of each main resonant circuit.

4. The converter according to claim 3, in which a first neutral point, of the at least one neutral point, is connected to the primary windings of the transformers of each main resonant circuit.

5. The converter according to claim 4, in which the main resonant circuits of the converter are each connected to a respective input structure including at least one switch configured to control an energy circulating in the main resonant circuit, the impedance connected to the first neutral point being configured to store energy and to enable zero voltage switching of the switches of said input structures.

6. The converter according to claim 5, wherein the first inductive element, the resonance capacitor, and the primary winding of each main resonant circuit are coupled in series between their respective input structure and the first neutral point.

7. The converter according to claim 3, in which a second neutral point is connected to the secondary windings of the transformers of each main resonant circuit.

8. The converter according to claim 7, in which the main resonant circuits of the converter are each connected to a respective output structure including at least one switch configured to control an energy circulating in said main resonant circuit, the impedance connected to the second neutral point being configured to store energy and enable zero voltage switching of the switches of said output structures.

9. The converter according to claim 1, wherein said impedance comprises an inductor and a capacitor coupled in series.

10. The converter according to claim 9, wherein said components comprise electrical components.

* * * * *